(12) United States Patent
Lindem, III et al.

(10) Patent No.: US 9,906,378 B2
(45) Date of Patent: Feb. 27, 2018

(54) CAPABILITY AWARE ROUTING

(71) Applicant: CISCO TECHNOLOGY, INC., San Jose, CA (US)

(72) Inventors: Alfred C. Lindem, III, Cary, NC (US); Peter Psenak, Bratislava (SK); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 14/813,268

(22) Filed: Jul. 30, 2015

(65) Prior Publication Data

US 2016/0218961 A1   Jul. 28, 2016

Related U.S. Application Data

(60) Provisional application No. 62/108,329, filed on Jan. 27, 2015.

(51) Int. Cl.
  *H04L 12/46* (2006.01)
  *H04L 12/721* (2013.01)
  *H04L 12/751* (2013.01)

(52) U.S. Cl.
  CPC .......... *H04L 12/4633* (2013.01); *H04L 45/02* (2013.01); *H04L 45/127* (2013.01)

(58) Field of Classification Search
  CPC .... H04L 12/4633; H04L 45/127; H04L 45/02
  See application file for complete search history.

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| 6,148,000 A | 11/2000 | Feldman | 370/394 |
| 6,240,188 B1 | 5/2001 | Dondeti | 380/259 |
| 6,615,336 B1 | 9/2003 | Chen | 370/351 |
| 6,771,673 B1 | 8/2004 | Baum | 370/535 |
| 7,111,101 B1 | 9/2006 | Bourke | 326/40 |
| 7,519,733 B1 | 4/2009 | Thubert | 709/232 |
| 7,551,599 B2 | 6/2009 | Levi | 370/254 |

(Continued)

FOREIGN PATENT DOCUMENTS

| | | | |
|---|---|---|---|
| CN | 101572667 | 11/2009 | H04L 12/56 |
| CN | 102025538 | 4/2011 | H04L 12/56 |
| WO | WO 2007/095331 | 8/2007 | 370/390 |

OTHER PUBLICATIONS

Li, Tony et al., "IGP Requirements for Traffic Engineering With MPLS, draft-li-mpls-igp-te-00.txt." Network Working Group, Internet-Draft. Feb. 1999. pages 1-6.

(Continued)

*Primary Examiner* — Phuc H Tran
(74) *Attorney, Agent, or Firm* — Campbell Stephenson LLP

(57) ABSTRACT

Various systems and methods for bypassing one or more non-capable nodes. For example, one method involves a capable node determining that an adjacent node is non-capable, where capable nodes are configured to implement a data plane capability and non-capable nodes are not. The method then involves identifying a downstream node that is capable. The downstream node is on a shortest path. The method also involves generating information that identifies a tunnel to the downstream node.

21 Claims, 11 Drawing Sheets

(56) References Cited

U.S. PATENT DOCUMENTS

| | | | |
|---|---|---|---|
| 7,925,778 B1 | 4/2011 | Wijnands | 370/389 |
| 8,320,374 B2 | 11/2012 | de Heer | 370/390 |
| 8,325,726 B2 | 12/2012 | Baban et al. | 370/390 |
| 8,774,179 B1 | 7/2014 | Gaggara | 370/389 |
| 8,787,400 B1 | 7/2014 | Barth | 370/419 |
| 8,848,728 B1 | 9/2014 | Revah | 370/389 |
| 8,880,869 B1* | 11/2014 | Shah | H04L 63/162 713/151 |
| 8,942,256 B1 | 1/2015 | Barth | 370/255 |
| 9,065,766 B2 | 6/2015 | Matsuoka | |
| 2002/0126661 A1 | 9/2002 | Ngai | 370/380 |
| 2002/0191628 A1 | 12/2002 | Liu | 370/428 |
| 2003/0043802 A1 | 3/2003 | Yazaki | 370/389 |
| 2003/0142685 A1 | 7/2003 | Bare | 370/410 |
| 2003/0210695 A1 | 11/2003 | Henrion | 370/392 |
| 2004/0264374 A1 | 12/2004 | Yu | 370/230 |
| 2005/0169270 A1 | 8/2005 | Mutou | 370/390 |
| 2006/0133298 A1* | 6/2006 | Ng | H04L 45/02 370/254 |
| 2006/0182035 A1 | 8/2006 | Vasseur | 370/238 |
| 2006/0280192 A1 | 12/2006 | Desanti | 370/409 |
| 2007/0127474 A1 | 6/2007 | Mirtorabi et al. | 370/390 |
| 2007/0189291 A1 | 8/2007 | Tian | 370/390 |
| 2008/0159285 A1 | 7/2008 | De Heer | 370/390 |
| 2008/0165783 A1 | 7/2008 | Desanti | 370/392 |
| 2009/0067348 A1 | 3/2009 | Vasseur | 370/256 |
| 2009/0219817 A1 | 9/2009 | Carley | 370/235.1 |
| 2009/0310610 A1 | 12/2009 | Sandstrom | 370/394 |
| 2010/0046515 A1 | 2/2010 | Wong | 370/390 |
| 2011/0202761 A1 | 8/2011 | Sarela et al. | 716/163 |
| 2011/0228770 A1 | 9/2011 | Dholakia | 370/390 |
| 2011/0274112 A1 | 11/2011 | Czaszar | 370/392 |
| 2012/0099591 A1 | 4/2012 | Kotha | 370/392 |
| 2012/0243539 A1 | 9/2012 | Keesara | 370/392 |
| 2013/0034097 A1 | 2/2013 | Dharmapurikar | 370/390 |
| 2013/0114595 A1 | 5/2013 | Mack-Crane | 370/390 |
| 2013/0114619 A1 | 5/2013 | Wakumoto | 370/406 |
| 2013/0136117 A1 | 5/2013 | Schrum, Jr. | 370/338 |
| 2013/0201988 A1 | 8/2013 | Zhou | 370/390 |
| 2013/0308948 A1 | 11/2013 | Swinkels | 398/66 |
| 2013/0336315 A1 | 12/2013 | Guichard | 370/389 |
| 2013/0343384 A1 | 12/2013 | Shepherd | 370/390 |
| 2014/0010223 A1 | 1/2014 | Wang | 370/338 |
| 2014/0043964 A1 | 2/2014 | Gabriel | 370/229 |
| 2014/0098813 A1 | 4/2014 | Mishra | 370/390 |
| 2014/0119191 A1 | 5/2014 | Onoue | 370/236 |
| 2014/0160925 A1 | 6/2014 | Xu | 370/235 |
| 2015/0003458 A1 | 1/2015 | Li | 370/392 |
| 2015/0023328 A1 | 1/2015 | Thubert et al. | 370/336 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0085635 A1 | 3/2015 | Wijnands et al. | 370/216 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0181309 A1 | 6/2015 | Wijnands et al. | 725/109 |
| 2015/0334006 A1 | 11/2015 | Shao | 370/225 |
| 2016/0127142 A1* | 5/2016 | Tian | H04L 12/1886 370/390 |
| 2016/0142248 A1 | 5/2016 | Thubert et al. | 370/372 |
| 2016/0182353 A1* | 6/2016 | Garcia-Luna-Aceves | H04L 45/306 709/241 |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2017/0099232 A1 | 4/2017 | Shepherd | 370/390 |
| 2017/0142006 A1 | 5/2017 | Wijnands et al. | 370/390 |

OTHER PUBLICATIONS

Moy. J., Ascend Communications, Inc., "OSPF Version 2," Network Working Group, Request for Comments 2328, Apr. 1998, pp. 1-244.

Psenak. P. et al., "OSPF Extensions for Segment Routing. draft-psenak-ospf-segment-routing-extension-05," Open Shortest Path First IGP, Internet-Draft. Jun. 2014. pp. 1-33.

Shen. Naiming et al.. "Calculating IGP Routes Over Traffic Engineering Tunnels. draft-ietf-rtgwg-igp-shortcut-01.txt." Network Working Group, Internet-Draft. May 2004. pp. 1-7.

Shen, N et al., "Calculating Interior Gateway Protocol (IGP) Routes Over Traffic Engineering Tunnels." Network Working Group. Request for Comments 3906. Oct. 2004, pp. 1-8.

Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).

Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).

Wang, Xiaorong et al.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).

Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).

Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Aguilar, L., "Datagram Routing for Internet Multicasting," SRI International, Menlo Park, California, ACM Sigcomm Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.;"Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

(56) References Cited

OTHER PUBLICATIONS

Hinden, R., Nokia and S. Deering, Cisco Systems, Inc.; "IP Version 6 Addressing Architecture," Network Working Group, Request for Comments 4291, Feb. 2006, pp. 1-25.
Kompella, K. et al., "The Use of Entropy Labels in MPLS Forwarding," Internet Engineering Task Force (IETF), Request for Comments 6790, Nov. 2012, pp. 1-25.
Kumar, N. et at., Cisco Systems, Inc., "OSPF Extension for Bit Index Explicit Replication, draft-kumar-ospf-bier-extension-00," Internet-Draft, May 19, 2014, pp. 1-7.
Kumar, N., et al., "BIER Use Cases, draft-kumar-bier-use-cases-00," Network Working Group, Internet-Draft, Oct. 25, 2014, pp. 1-7.
Laabs, Matthias, "SDI over IP—Seamless Signal Switching in SMPTE 2022-6 and a Novel Multicast Routing Concept," EBU Technical Review, 2012 Q4, pp. 1-7.
Microsoft,"IPv6 Addressing (TechRef)"; Apr. 3, 2011; http://technet.microsoft.com/enus/library/dd392266(v=ws.10).aspx; pp. 1-30.
Przygienda, T. et at., "M-ISIS: Topology (MT) Routing in Intermediate System to Intermediate Systems (IS-ISs)," Network Working Group, Request for Comments 5120, Feb. 2008, pp. 1-14.
Psenak, P. et al., "Multi-Topology (MT) Routing in OSPF," Network Working Group, Request for Comments 4915, Jun. 2007, pp. 1-20.
Psenak, P. et al., Cisco Systems; "OSPF Extensions for BIER, draft-psenak-ospf-bier-extensions-00," OSPF, Internet-Draft, Sep. 27, 2014, pp. 1-6.
Psenak, P. et al., Cisco Systems; "OSPF Extensions for BIER, draft-psenak-ospf-bier-extensions-01," OSPF, Internet-Draft, Oct. 24, 2014, pp. 1-8.
Rekhter, Ed. Y. et al., "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-13vpn-mvpn-bier-01," Internet Engineering Task Force, Internet-Draft, Oct. 16, 2014, pp. 1-9.
Schulzrinne, H. et al.,; "RTP: A Transport Protocol for Real-Time Applications," Network Working Group, Request for Comments 3550, Jul. 2003, pp. 1-89.
SMPTE, "Beyond The Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.
Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Xu, X. et al., "BIER Encapsulation, draft-xu-bier-encapsulation-00," Network Working Group, Internet-Draft, Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].

* cited by examiner

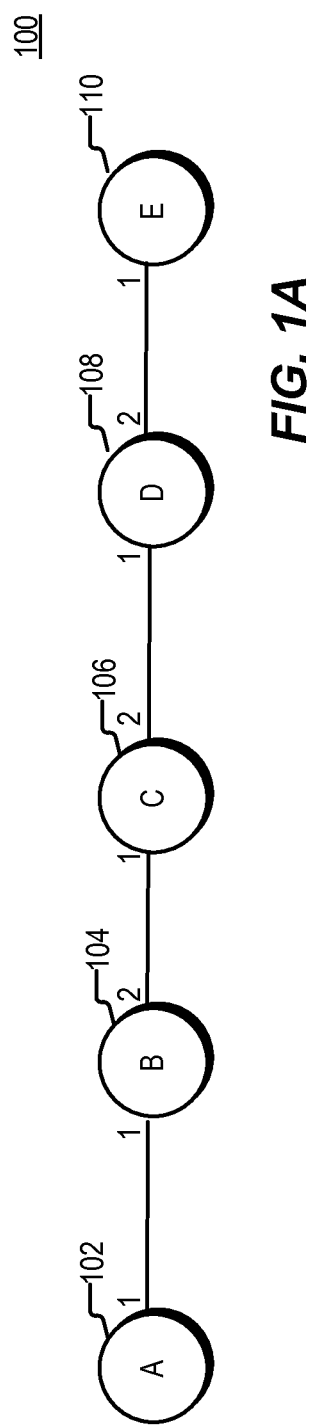

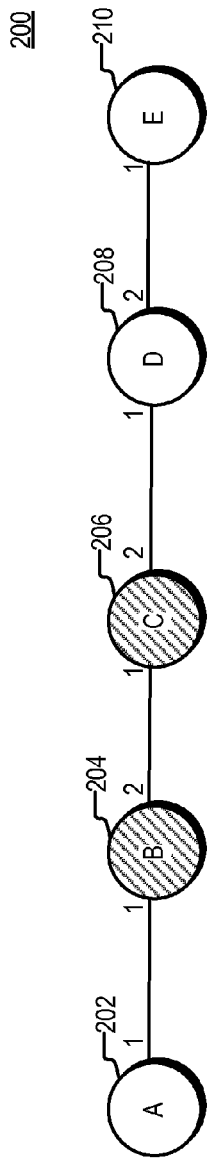

| A | B | C | D | E |
|---|---|---|---|---|
| NH, NH$_C$ | NH, NH$_C$ | NH, NH$_C$ | NH, NH$_C$ | NH, NH$_C$ |
| A, A | -- | -- | -- | -- |

FIG. 3A

| Tunnel Prototype |
|---|
|  |

FIG. 3B

| Tunnels |
|---|
|  |

FIG. 3C

| A | B | C | D | E |
|---|---|---|---|---|
| NH, NH$_C$ | NH, NH$_C$ | NH, NH$_C$ | NH, NH$_C$ | NH, NH$_C$ |
| A, A | B, -- | -- | -- | -- |

FIG. 4A

| Tunnel Prototype |
|---|
| B |

FIG. 4B

| Tunnels |
|---|
|  |

FIG. 4C

| A | B | C | D | E |
|---|---|---|---|---|
| NH, NH$_C$ | NH, NH$_C$ | NH, NH$_C$ | NH, NH$_C$ | NH, NH$_C$ |
| A, A | B, -- | B, -- | -- | -- |

FIG. 5A

| Tunnel Prototype |
|---|
| B |
| C |

FIG. 5B

| Tunnels |
|---|
|  |

FIG. 5C

| A | B | C | D | E |
|---|---|---|---|---|
| NH, NH$_C$ | NH, NH$_C$ | NH, NH$_C$ | NH, NH$_C$ | NH, NH$_C$ |
| A, A | B, -- | B, -- | B, T$_D$ | -- |

FIG. 6A

| Tunnel Prototype |
|---|
|  |

FIG. 6B

| Tunnels |
|---|
| T$_D$ |

FIG. 6C

| A | B | C | D | E |
|---|---|---|---|---|
| NH, NH$_C$ | NH, NH$_C$ | NH, NH$_C$ | NH, NH$_C$ | NH, NH$_C$ |
| A, A | B, -- | B, -- | B, T$_D$ | B, T$_D$ |

FIG. 7A

| Tunnel Prototype |
|---|
|  |

FIG. 7B

| Tunnels |
|---|
| T$_D$ |

CAPABILITY AWARE ROUTING

RELATED APPLICATIONS

This application claims the benefit under 35 U.S.C. §119 (e) of U. S. Provisional Patent Application No. 62/108,329, filed on Jan. 27, 2015, entitled "Data Plane Capability-Aware Topologies." The above-referenced application is hereby incorporated by reference herein in its entirety.

BACKGROUND OF THE INVENTION

Network nodes forward data along paths from one node to another. A path often includes multiple nodes and links. When a node receives data, such as a packet, the node determines the next-hop node on the path towards the data's destination and forwards the data to the next-hop node. This continues, with each node along the path determining the next-hop and forwarding the data along the path, until the data reaches its destination at the end of the path.

Paths are typically determined by routing protocols. For example, there may be multiple paths to forward data from a first node to a second node. A routing protocol determines what those paths are, and often identifies an optimal path from among the many possible paths. For example, link state routing protocols calculate the shortest (based on certain routing metrics) path from a given node to all other nodes in a particular topology. Link state protocols perform a shortest path first (SPF) calculation and generate an SPF tree (SPT).

Sometimes paths calculated by the routing protocol are not satisfactory for some reason. For example, a user may determine that a path includes a node to which the user does not want data forwarded. Or a user can determine that data should be forwarded to a particular node that is not on the path. A user can establish a tunnel to direct data from one specific node to another specific node, thereby causing the data to bypass nodes the user wishes to bypass and ensuring that data reaches nodes the user wants the data to reach. While tunnels can be useful, typical tunneling methods have certain limitations, such as requiring manual intervention by the user to modify established routing information.

BRIEF DESCRIPTION OF THE DRAWINGS

The present disclosure may be better understood, and its numerous objects, features, and advantages made apparent to those skilled in the art by referencing the accompanying drawings.

FIG. 1A is a simplified block diagram illustrating certain components of an example network.

FIG. 1B is an example table, according to the present description.

FIG. 2A is a simplified block diagram illustrating certain components of an example network.

FIG. 2B is an example table, according to the present description.

FIG. 2C is an example table, according to the present description.

FIG. 2D is an example data structure, according to the present description.

FIG. 2E is an example data structure, according to the present description.

FIG. 3A is an example table, according to the present description.

FIG. 3B is an example data structure, according to the present description.

FIG. 3C is an example data structure, according to the present description.

FIG. 4A is an example table, according to the present description.

FIG. 4B is an example data structure, according to the present description.

FIG. 4C is an example data structure, according to the present description.

FIG. 5A is an example table, according to the present description.

FIG. 5B is an example data structure, according to the present description.

FIG. 5C is an example data structure, according to the present description.

FIG. 6A is an example table, according to the present description.

FIG. 6B is an example data structure, according to the present description.

FIG. 6C is an example data structure, according to the present description.

FIG. 7A is an example table, according to the present description.

FIG. 7B is an example data structure, according to the present description.

FIG. 7C is an example data structure, according to the present description.

DETAILED DESCRIPTION

Figure 8:
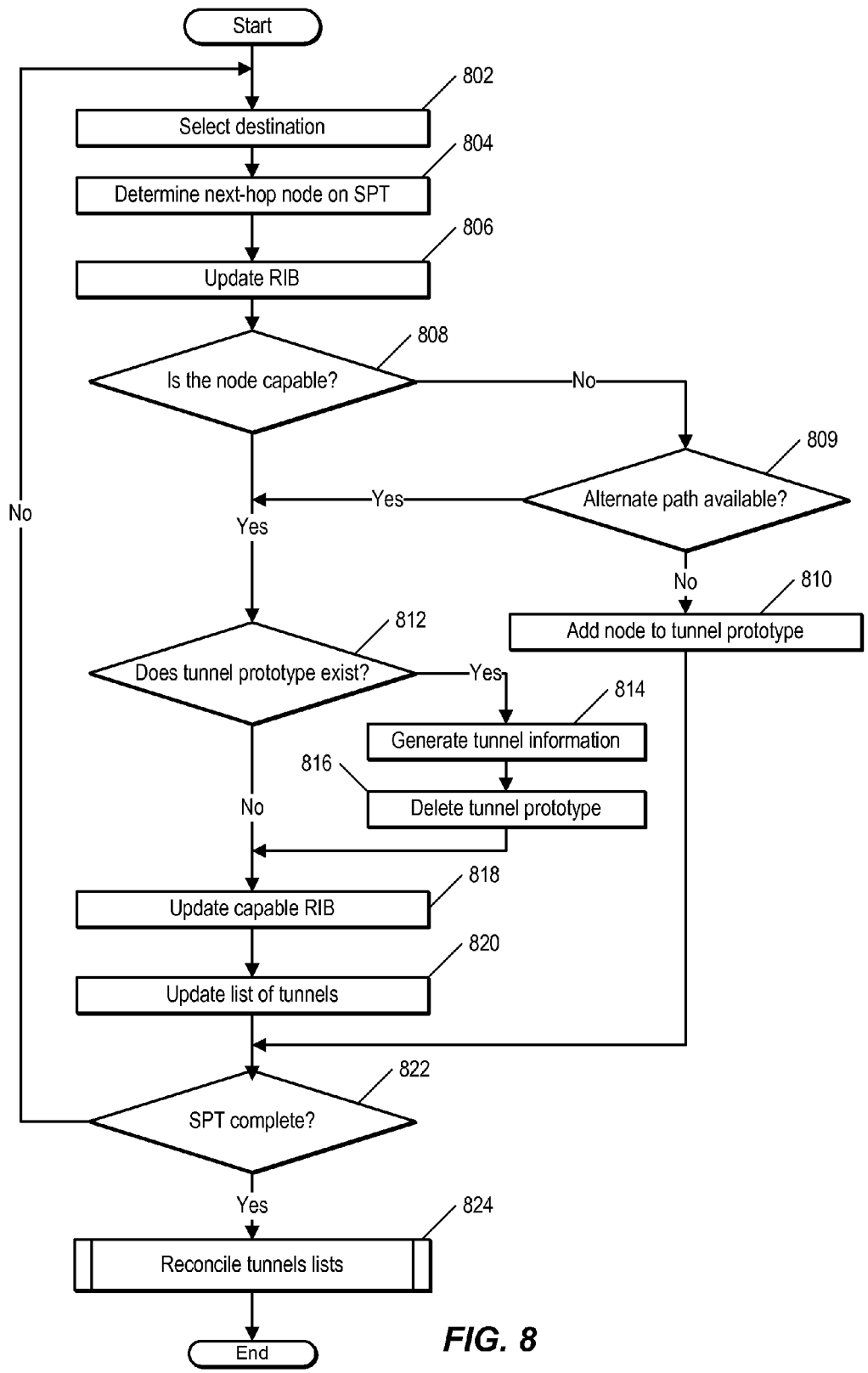
FIG. 8 is a flow chart illustrating an example process, according to the present description.

Various systems and methods for bypassing one or more non-capable nodes. For example, one method involves a capable node determining that an adjacent node is non-capable, where capable nodes are configured to implement a data plane capability and non-capable nodes are not. The method then involves identifying a downstream node that is capable. The downstream node is on a shortest path. The method also involves generating information that identifies a tunnel to the downstream node.

Generally speaking, networks are made up of nodes and the links between the nodes. Nodes are configured to perform various forwarding tasks, routing tasks, and to provide various other services, such as operations, administration, and management (OAM) processes, packet inspection, and the like. The tasks and operations a node is configured to perform are known herein as the node's capabilities. For example, a given node may be configured to forward data using Internet Protocol (IP), but may not be configured to forward data using Multiprotocol Label Switching (MPLS). If a node is capable of performing a certain task, the node is referred to herein as a capable node with regard to the task. If a node is not capable of performing a certain task, the node is referred to herein as a non-capable node with regard to the task. In this example, the node is a capable node as regards IP, but a non-capable node as regards MPLS.

It is not uncommon that a network includes some nodes that do not support a certain feature or capability and other nodes that do. This situation can arise, for example, if newer nodes are added to a network or some nodes in a network are upgraded to support new features. When such a "mixed-capability" network exists, difficulties can arise. For example, if a node's neighbor forwards a packet to the node using a forwarding protocol for which the node is non-capable, the node will be unable to properly process the packet and the packet may be dropped.

One way to prevent negative consequences due to mixed-capability networks is to use tunnels. A tunnel is a communication channel between two end point nodes and related forwarding and routing information that describes the tunnel. Using tunnels commonly involves encapsulating data that is formatted according to a first protocol within packets formatted according to a second protocol, and transmitting the encapsulated packets between two end point nodes according to the second protocol. For example, an IP packet can be encapsulated within an MPLS packet, and forwarded between two end point nodes using MPLS. Encapsulating data typically involves adding header and, optionally, trailer information to the data.

Tunnels can be used to prescribe a specific route that may differ from the path specified by the routing protocol as being the optimal path. This can be helpful to control data flow. However, using tunnels introduces a number of issues. Setting up a tunnel is typically a manual process requiring user intervention to modify routing information and procedures. Tunnels, as typically implemented, also require maintenance. For example, manually set up tunnels run the risk of becoming stale, which can negatively impact network performance, unless the manually set up tunnels are refreshed. Refreshing tunnels is typically a manual process as well.

Generally, setting up a tunnel involves a user, such as an administrator, manually configuring information about a tunnel. For example, the user determines a start point (also referred to as the head or tunnel source) of the tunnel and an endpoint (also referred to as the tail or tunnel destination) of the tunnel. The user manually updates routing and/or forwarding information with information identifying the tunnel. In some cases, the user also sets up policy based routing to control which traffic is forwarded using the tunnel. This involves establishing access control lists to identify traffic of a specific class or group that will be admitted to the tunnel. As can be seen, typical tunnel implementations are labor-intensive and relatively slow, as compared with automatic route determination. Also, if a user sets up a tunnel manually according to a specific path, and the topology of the network changes such that the path taken by the tunnel is less efficient, the user has to manually update (refresh) the tunnel information.

Described herein are aspects of automatic tunneling. These aspects avoid issues associated with typical tunnel implementations, such as the issues discussed above, as well as other issues. The tunneling described herein involves the routing protocol determining tunnel endpoints for tunnels to bypass non-capable nodes. The routing protocol determines whether each node in a network is capable or non-capable with regard to a given feature. As the routing protocol builds the shortest path first (SPF) tree, the routing protocol determines whether a selected next-hop node for a given path is capable. If not, the routing protocol stores information indicating which nodes on the path are non-capable, and when the routing protocol locates the next capable node on the path, the routing protocol determines that the next capable node should be a tail endpoint of a tunnel bypassing the one or more non-capable nodes on the path. The routing protocol stores information describing the tunnel, such as the head and tail nodes, to be used to forward data using the tunnel.

FIG. 1A shows network 100. Network 100 includes nodes 102 through 110. Each of nodes 102 thru 110 has interfaces that are identified as shown and includes one or more network devices, such as switches and/or routers, configured to forward data, such as packets. While data is referred to herein as being formatted as packets, such reference is not intended to be limiting, and the descriptions herein also apply to datagrams, data streams, and any form of non-packetized data. Nodes 102 through 110 are coupled by links. The links are implemented as some form of transmission medium, such as copper wire, fiber optic cable, wireless communication channels, and the like.

Nodes 102 through 110 implement one or more routing protocols and forwarding protocols. In one embodiment, nodes 102 through 110 implement a link state routing protocol, such as intermediate system to intermediate system (ISIS) or open shortest path first (OSPF). Additional details regarding operation of the link state routing protocol are provided in conjunction with FIG. 2.

In response to a node of network 100 receiving data, such as a packet, addressed to another node of network 100, the receiving node determines how to forward the data and forwards the data along a path to the intended node. For example, in response to receiving a packet, node 102 determines an interface to which the packet should be forwarded. In one embodiment, node 102 examines a packet header, locates a destination address field, and determines the address contained therein. Node 102 then performs a forwarding lookup to determine from which interface packets containing the destination address should be forwarded, and relays the packet to the interface identified by the forwarding lookup. The forwarding lookup utilizes forwarding information, such as a forwarding table. The forwarding information is based on routing information, such as a routing table, as described with regard FIG. 1B.

Nodes 102 through 110 generate routing information, such as a routing table, also referred to as a routing information base (RIB). FIG. 1B shows an example routing table generated by node 102 of FIG. 1A. The routing table includes information identifying each destination in network 100. This information is shown in the destination column. The routing table also includes a next-hop column. The next-hop column includes an identifier that identifies the next-hop to which data should be forwarded to reach the corresponding destination. For example, if node 102 wishes to send data to node 106, node 102 should forward the data to node 104. Node 104 is the next-hop node associated with destination node 106. Node 104 in turn forwards the data to node 106. Likewise, if node 102 wishes to forward data to node 108, node 102 first forwards the data to node 104. Node 104 in turn forwards the data to node 106, and node 106 in turn forwards the data node 108. The routing table is generated by a routing protocol, such as a link state interior gateway protocol (IGP) of which ISIS and OSPF are two examples.

FIG. 2A shows an example network 200. Network 200 is similar to network 100 of FIG. 1A. However, network 200 is a mixed-capability network that includes some nodes that support a particular feature, such as a data plane capability, and some nodes that do not support the particular feature. As shown, network 200 includes nodes 202 through 210. Nodes 202, 208, and 210 are capable nodes, while nodes 204 and 206 are non-capable nodes. Non-capable nodes are nodes that are not capable of supporting a particular capability or providing a particular functionality. For example, one data plane capability is known as bit-indexed explicit replication (BIER). In the example of FIG. 2A, nodes 204 and 206 do not support BIER. That is, if one of the non-capable nodes 204 or 206 receives data formatted according to BIER (e.g., a packet having BIER information in the header), the non-capable node cannot forward the packet using BIER. Unless additional steps are taken, the non-capable node will drop the packet.

In one embodiment, the routing protocol implemented by a capable node discovers how a tunnel can be used to bypass the non-capable nodes. In order to bypass non-capable nodes, the routing protocol determines which nodes are capable and which nodes are non-capable. BIER is one example of a capability that can be used to differentiate capable nodes from non-capable nodes. Any other criteria that can be evaluated by the routing protocol can be used to classify nodes as capable or non-capable. For example, the routing protocol can consider only nodes with a certain hardware and/or software configuration as capable nodes, and can determine which nodes satisfy the hardware and/or software criteria by accessing information made available by the nodes. In one embodiment, the routing protocol uses information received in link state advertisements (LSAs) or other routing update messages to determine whether a node is capable or not. The term LSA is used throughout to refer to any link state protocol message used by any link state protocol, and is not limited to any one particular protocol.

Convergence refers to the process of nodes in a network coming to agreement on the topology of the network. In one embodiment, this involves building a link state database and determining that each node in a network has the same link state database (LSDB). An example link state database is shown in FIG. 2B. Link state databases are built using information contained in link state advertisements. Each node floods its link state advertisement to the other nodes in a network or domain and each node aggregates the information from the link state advertisements it receives into a LSDB. A link state advertisement (LSA) includes information identifying the node that sent the link state advertisement. In one embodiment, the information includes a network identifier, such as a destination address and mask. LSAs also include information identifying the node's connections and, optionally, information concerning the capabilities and characteristics of the node. Each node in network 200 uses the link state advertisements it receives to build its link state database. As shown in FIG. 2B, the link state database includes: an "Address" column that includes information identifying nodes, e.g., by network identifier; a column labeled "Attached" that includes information identifying the corresponding node's connections; and a column labeled "Capable" that includes information indicating whether the corresponding node is capable of using a given feature or data plane capability. Consider as an example the entry for node 204. The link state database includes information identifying node 204, such as a prefix or other ID, in this case "B." The link state database indicates, in the "Attached" column, that the node identified by the network identifier "B" is connected to nodes identified by the network identifiers "A" and "C." The "Capable" column indicates that node "B" does not support a particular capability, for example, BIER.

FIG. 2C shows an example routing table built by node 202. The routing table is identical to that shown in FIG. 1B, and identifies shortest path next-hops to each destination in network 200. The table shown in 2C is known as the node's unicast routing table, and the routing protocol implemented by the node builds the unicast routing table independently of any capability information. Building the routing table involves performing a shortest path first calculation using a shortest path first algorithm, such as Dijkstra's algorithm.

The routing protocol also builds a routing table for each capability. In one embodiment, the routing protocol detects a subset of nodes that support a particular topology and runs a separate SPF calculation for that subset, producing a routing table for those nodes. One such routing table generated by node 202 is shown in FIG. 2D. The routing table shown in FIG. 2D only lists nodes that are capable nodes (in this example, capable of forwarding data using BIER). As can be seen, the capable nodes in network 200 are node 202, node 208, and node 210. If node 202 forwards data to node 208 normally, e.g. using the routing table shown in FIG. 2C, node 202 would first forward the data to node 204. However, if the data is being forwarded with a capability that node 204 does not support, for example, BIER, node 204 is unable to forward the data towards node 208, and the data never reaches its destination. To avoid this, node 202 uses a tunnel to forward data to node 208. This is reflected in the routing table shown in FIG. 2D. Instead of the next-hop for node 208 being listed as node 204, the next-hop is listed as information (namely the tunnel identifier $T_D$) identifying a tunnel to node 208.

FIG. 2E shows a data structure that resolves the tunnel identifier $T_D$. FIG. 2E indicates that the tunnel corresponding to tunnel identifier $T_D$ includes a tunnel from node 202 through nodes 204 and 206 and having a tail end at node 208. There are a number of tunneling protocols that can be used to implement a variety of tunnel types, such as a generic routing encapsulation (GRE) tunnel, a traffic engineering (TE) tunnel, a Multi-protocol Label Switching switched path (MPLS LSP), a segment routing (SR) tunnel, and an Internet Protocol (IP) tunnel, to name a few. In one embodiment, the head end node determines that a tunnel will be used and determines the tail end node, based on the routing information. The head end node then, depending on the type of tunnel used, signals to the tail end node, and any intermediate nodes, information to be used in implementing the tunnel, such as label information in the case of an MPLS LSP. The intermediate nodes receive a tunneled packet, determine that the packet should be forwarded to the next node in the tunnel, modify tunnel encapsulation information of the packet, and forward the packet to the appropriate interface. The intermediate nodes do not access the packet itself. After the packet reaches the tail end of the tunnel, the tail end node FIGS. 3 through 7 show an example of building a SPF tree. The SPF tree can be built by a routing protocol implemented by a node, such as node 202 of FIG. 2A. In the discussion of FIGS. 3 through 7, the SPF tree is built for network 200 of FIG. 2A, and nodes are referred to by their indicated network identifiers. Node A determines all destinations in the network. In the example of FIG. 2A, this includes Nodes A through E. As described above, identifying the nodes in the network occurs during the process of network convergence. Node A iteratively determines a next-hop for each destination so that if Node A receives data addressed to any of the destinations, Node A will have routing information indicating how that data should be routed. Node A generates routing information, such as a routing table or routing information base (RIB) for each capability, such as unicast, BIER, and the like. In one embodiment, Node A performs a separate SPF tree calculation for each capability. In another embodiment, Node A generates the multiple RIBs in a single SPF tree calculation. For the sake of brevity, FIGS. 3 through 7 are described as though the separate RIBs are generated in a single tree calculation. In FIGS. 3A, 4A, 5A, 6A, and 7A, an SPF tree table is shown. Though described in terms of an SPF tree table, it is understood that any suitable data structure can be used to store the SPF information. Node A generates the information, updates the SPF tree table, and stores the SPF tree table in memory. Each destination node has two entries, one entry that identifies the unicast next-hop (NH) and one entry that identifies the capable next-hop ($NH_C$). Additional RIBs can be generated for additional capabilities, and would be represented as additional entries in the SPF tree table of FIGS. 3A, 4A, 5A, 6A, and 7A. During the SPF tree building process shown in FIGS. 3 through 7, Node A also determines if any tunnels can be used to bypass non-capable nodes, and which nodes are affected by the tunnels, if any. If any tunnels are to be used, Node 202 generates information used to implement the tunnels, and updates data structures to store the information, as explained below.

FIG. 3A shows a first iteration of the SPF tree building process employed by Node A. In this iteration, Node A selects the first destination (Node A itself) and determines that the next-hop towards Node A is Node A itself. Node A updates the NH entry in the SPF tree table and the unicast RIB, such as the routing table of FIG. 2C, indicating that the next-hop on the SPF tree from Node A to Node A is Node A itself. Node A determines whether Node A is capable, e.g., whether Node A configured to implement a particular data plane capability, such as BIER. In this example, Node A is capable, and Node A updates the $NH_C$ entry and the capable RIB, such as the routing table of FIG. 2D, to indicate that the capable next-hop from Node A to Node A is Node A.

Node A also generates data structures shown in FIGS. 3B and 3C. FIG. 3B is a tunnel prototype data structure. If Node A determines that any non-capable nodes have been encountered during the SPF tree building process, where the non-capable nodes are on the shortest path from Node A towards a given destination, Node A updates the tunnel prototype data structure with information identifying the non-capable node(s). If a tunnel is to be used to bypass one or more nodes, after Node A determines the tunnel tail end node of the tunnel, Node A updates a list of tunnels, as shown at FIG. 3C. The tunnels list shown in FIG. 3C includes information that identifies tunnels that result from the ongoing SPF tree calculation. In this case, Node A has not determined that a tunnel is used, so the tunnels list is empty.

FIG. 4A shows a second iteration of the SPF tree building process. In this iteration, Node A selects the next nodes, those that are adjacent (e.g., directly connected) to Node A and those for which no next-hop has yet been calculated. In this case, the only directly connected node is Node B. Node A determines that the next-hop on the shortest path towards Node B is Node B. Node A updates the NH entry in the SPF tree table and the unicast RIB in FIG. 2C to indicate that the next-hop on the SPT from Node A to Node B is Node B. Node A determines whether Node B is capable. In this case, Node B is non-capable. In response to this determination, Node A knows that a tunnel will be needed to bypass Node B. However, the endpoint of the tunnel is unknown, since Node A has not yet completed the SPF tree. At this point, Node A knows that data cannot be forwarded to Node B using the capability (e.g., BIER), and that if any downstream nodes are capable, Node A will create a tunnel to reach those nodes. Node A leaves the $NH_C$ field blank in the SPF tree graph, as well as the entry in the capable RIB.

Node A generates information indicating that a tunnel having its head at Node A and traversing the path including Node A and Node B and one or more as yet undetermined nodes will be created in response to determining the next capable node on Node A's SPF tree. This information is referred to as a tunnel prototype next-hop. As shown in FIG. 4B, information identifying Node B has been added to the tunnel prototype data structure. The tunnels list is still blank, as shown in FIG. 4C, since no tunnel tail end nodes have been determined.

FIG. 5A shows a third iteration of the SPF tree building process. In this iteration, Node A considers all directly connected nodes not yet added to Node A's SPF tree (none) and all downstream nodes (e.g., nodes that are directly connected to the nodes that have been added to Node A's SPF tree or nodes that are more than one hop away from Node A towards a given destination node). The only node added is Node B and the only node directly connected to Node B is Node C. Node C inherits Node B as its next-hop from its parent (Node B), and Node A updates NH field in the SPF tree graph and the unicast RIB indicating that the next-hop on the SPT from Node A to Node C is Node B. Node A determines whether Node C is capable. In this case, Node C is non-capable. Node A updates the tunnel prototype next-hop data structure, as shown in FIG. 5B, to indicate that the tunnel with its head at Node A will traverse a path including Node A, Node B, Node C, and one or more as yet undetermined nodes. The tunnels list is still blank, as shown in FIG. 5C, since no tunnel tail end nodes have been determined.

FIG. 6A shows a fourth iteration of the SPF tree building process. In this iteration, Node A considers all directly connected nodes not yet added to Node A's SPF tree (none) and all nodes that are directly connected to the nodes that have been added to Node A's SPF tree (Node B and Node C). The only node directly connected to Node B or Node C and not yet added to Node A's SPT is Node D. Node D inherits Node B as its next-hop from its parent (Node C), and Node A updates the NH entry of the SPF tree graph and the unicast RIB indicating that the next-hop on the SPT from Node A to Node D is Node B. Node A determines whether Node D is capable. In this case, Node D is capable. Node A determines that the tunnel prototype next-hop that represents the tunnel having its head at Node A and traversing Node B and Node C will have its tail end at Node D. Node A generates information that identifies this tunnel, e.g., a tunnel identifier. The tunnel identifier is, in this example, $T_D$. Node A updates the $NH_C$ field of the SPF tree and the capable RIB to indicate that the capable next-hop from Node A to Node D is tunnel $T_D$. Node A updates the tunnels list to include the tunnel identifier $T_D$, as shown at FIG. 6C, and clears the tunnel prototype data structure associated with the tunnel, as shown at FIG. 6B. Updating the capable RIB to include $T_D$ as the next-hop for Node D means that if data is received at Node A addressed to Node D, Node A performs a forwarding lookup and determines that the data will be forwarded using tunnel $T_D$. There are a number of different tunneling mechanisms that can be used to implement $T_D$. Which is selected is implementation specific and depends on the forwarding capabilities implemented by Node A and network 200.

FIG. 7A shows a fifth iteration of the SPF tree building process. In this iteration, Node A considers all directly connected nodes not yet added to Node A's SPF tree (none) and all nodes that are directly connected to the nodes that have been added to Node A's SPF tree (Node B, Node C, and Node D). The only node directly connected to Node B, Node C, or Node D and not yet added to Node A's SPF tree is Node E. Node E inherits Node B as its unicast next-hop from its parent (Node D), and Node A updates the SPF tree and the unicast RIB indicating that the next-hop on the SPF tree from Node A to Node E is Node B. Node A determines whether Node E is capable. In this case, Node E is capable. Node E inherits tunnel $T_D$ as its next-hop from its parent (Node D). Node A updates the $NH_C$ field of the SPF tree and the capable RIB to indicate that the capable next-hop from Node A to Node E is tunnel next-hop $T_D$. Node A does not update either the tunnel prototype data structure, as shown in FIG. 7B, or the tunnels list, as shown in FIG. 7C.

FIG. 8 shows additional details of generating routing information. In one embodiment, the routing information is used to generate a tunnel that bypasses one or more non-capable nodes. The method of FIG. 8 can be performed by a node, such as node 202 of FIG. 2A. In one embodiment, the node generates the routing information coincident with performing a SPF tree building process.

At 802, the node selects a destination node. In one embodiment, the node will iteratively select each destination node in a network, such as each destination node from which it has received a link state advertisement and determine the next-hop towards that destination node. At 802, during the initial iteration of FIG. 8, the first destination node is selected.

At 804, the node determines the next-hop node on the shortest path towards the selected destination node. The next-hop node is an adjacent, or directly connected node. The node implements, in one embodiment, a SPF calculation, such as Dijkstra's algorithm. For example, the SPF determines a cost associated with reaching possible next-hop nodes and selects the next-hop node having the lowest cost. Cost, as used herein, can refer to the path length, bandwidth, load, and the like.

At 806, the node updates the routing information base (RIB) with information identifying the next-hop node. For example, the node updates a routing table as shown in FIG. 2B. The node determines the next-hop node without regard to capability, and the RIB is the unicast RIB. In one embodiment, the unicast RIB is calculated and generated separately from the generation of a feature specific RIB. In such an embodiment, step 806 would be performed separately.

The node determines, at 808, whether the next-hop node is a capable node as regards a particular feature or capability. That is, the node determines whether the next-hop node is capable of implementing the particular feature. In one embodiment, this determination involves accessing information received in a link state advertisement from the next-hop node. For example, the node can access a link state database to determine whether the node is capable or not. The node performs the check at 808 to determine whether a node is capable for nodes that are adjacent to the node and for nodes that are adjacent and downstream from a string of one or more non-capable nodes that is adjacent to the node. That is, if the next-hop node adjacent to the node towards a given destination that is multiple hops away is capable, the node can forego determining whether destination is capable. If, on the other hand, each node on the SPT between the node and a destination multiple hops away is non-capable, then the node determines whether the destination is capable. The nodes depend on those nodes that are adjacent to non-capable nodes to set up the tunnels bypassing the non-capable nodes.

If the node determines that the next-hop node is not capable, the node determines, at 809, whether any alternative paths exist, such as equal cost multi-paths (ECMPs). If no ECMP paths exist, the node determines that tunnels will be used to bypass the non-capable node, and the node adds information identifying the next-hop node to a tunnel prototype, at 810. In one embodiment, the tunnel prototype is a temporary data structure that includes a list of non-capable nodes along the shortest path towards a particular destination. However, if alternative paths exist, then the node may select an alternative path and thereby avoid implementing a tunnel to bypass the non-capable node. Additional details describing a procedure when multiple paths exist are described with regard to FIGS. 11A and 12.

If, on the other hand, the node determines at 808 that the next-hop node is capable, or if an alternative path exists, the node determines, at 812, whether a tunnel prototype exists. If a tunnel prototype exists, the node knows that a tunnel is being constructed to bypass one or more non-capable nodes, and the node generates tunnel information at 814. In one embodiment, the tunnel information includes information identifying the head of the tunnel, which is the node itself, the tail of the tunnel, which is the first capable node along the shortest path towards the destination, and information identifying any intervening non-capable nodes. Information identifying the non-capable nodes being bypassed by the tunnel can be read from the tunnel prototype. At 816, the node deletes the tunnel prototype.

At 818, the node updates the capable RIB, such as the routing table shown in FIG. 2D. In one embodiment, this involves updating the next-hop associated with the selected destination node to identify the tunnel. At 820, the node updates a list of tunnels that have been generated or identified during the ongoing SPF tree calculation. At 822, the node determines whether the shortest path first tree calculation is complete. In one embodiment, this involves determining whether a next-hop node has been determined for each destination node. If the SPF tree calculation is not complete, the method returns to 802 and another destination node that is selected. Otherwise, if the SPF tree calculation is complete, the node reconciles the tunnels list at 824, as discussed in greater detail with regard to FIG. 9.

Figure 9:
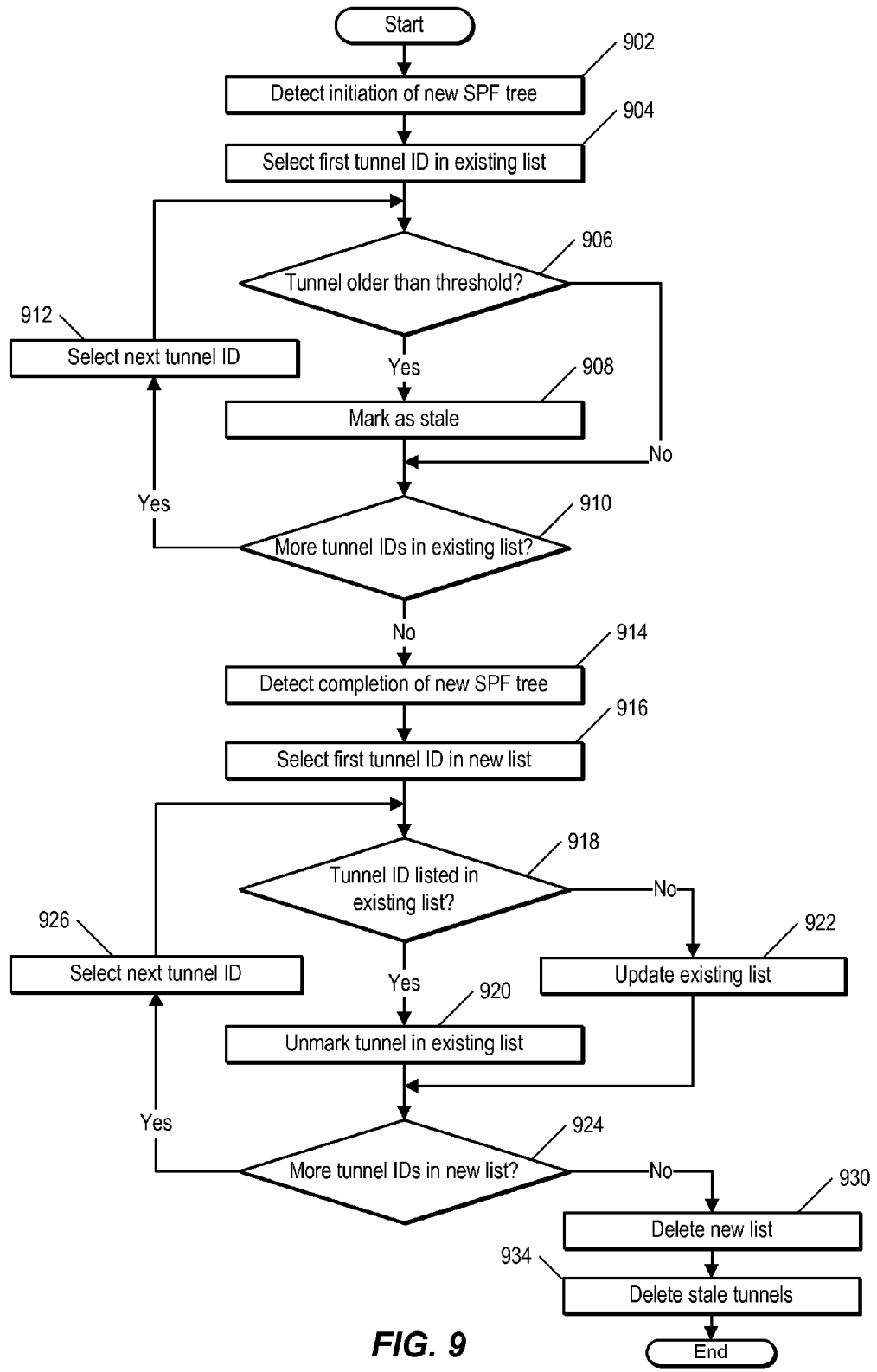
FIG. 9 is a flow chart illustrating an example process, according to the present description.

FIG. 9 shows details of performing a post-SPF examination. A post-SPF examination reconciles any existing lists of tunnels with a new list. In one embodiment, a node identifies tunnels that are stale (if any) and results in the stale tunnels being removed. The post-SPF examination also results in new tunnels (if any) being implemented. In one embodiment, a method of FIG. 9 is performed by a node, such as node 202 of FIG. 2A. At 902, a node detects initiation of a new SPF tree calculation. In one embodiment, a new SPF tree calculation is initiated in response to a node, such as one of the nodes in network 200 of FIG. 2A, detecting a configuration change. Example configuration changes can include nodes being added or removed from a network, such as network 200 of FIG. 2A, or capability changes of one or more of the nodes in the network. For example, in response to the capability to process data using BIER being added to a node, the node can trigger a new SPF calculation, e.g., by flooding a link state advertisement to other nodes in the network.

At 904, the node selects a first tunnel identified in an existing list of tunnels. The existing list of tunnels includes information (such as tunnel IDs) identifying each tunnel determined in one or more previous SPF tree calculations. The node determines, at 906, whether the tunnel is older than a specified threshold. If so, the node marks the tunnel as stale at 908. Implementing the age threshold is one way to employ hysteresis, which can avoid tunnels being brought up and down repeatedly, or flapping. At the end of the post-SPF examination, the node removes tunnels that are marked stale.

At 910, the node determines whether there are more tunnels in the existing tunnels list. If so, the node selects the next tunnel ID in the existing tunnels list and repeats. Otherwise, the node waits until it detects completion of the new SPF tree, at 914. After determining that the new SPF tree is complete, the node selects a first tunnel identified in a list of tunnels generated by the new shortest path first tree calculation.

The node determines, at 918, whether the selected tunnel ID is listed in the existing tunnels list. In one embodiment, this involves comparing the tunnel ID against one or more of the entries in the existing tunnel list. If a node determines that the tunnel is not listed in the existing tunnels list, the node updates the existing tunnels list by adding the tunnel to the list at 922. In one embodiment, this involves creating a new entry in the existing tunnels list, where the entry includes information identifying the tunnel, such as the tunnel ID.

If, on the other hand, the node determines at 918 that the tunnel already exists in the existing tunnels list, which would be the case, for example, if the configuration change that triggered calculation of the new shortest path first tree did not affect this particular branch of the shortest path first tree, the node unmarks the tunnel in the existing tunnels list, at 920. That is, the node indicates that the tunnel is no longer stale.

At 924, the node determines whether additional tunnels are identified in the list. If so, at 926, the node selects the next tunnel ID and repeats. Otherwise, upon completion of the traversal of the new list, the new tunnels list is deleted by the node at 930. The node removes stale tunnels from the existing tunnels list at 934.

Figure 10:
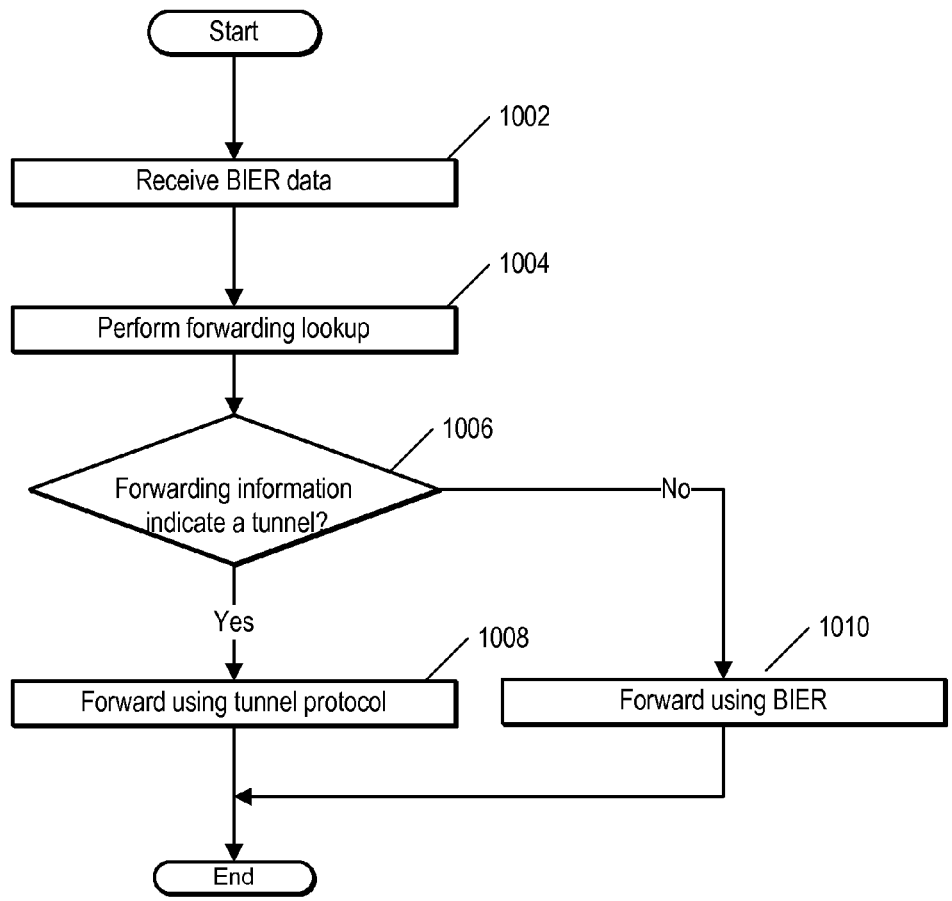
FIG. 10 is a flow chart illustrating an example process, according to the present description.

FIG. 10 is an example method of using a tunnel to bypass non-capable nodes. FIG. 10 can be performed by a node, such as node 202 of FIG. 2A. At 1002, the node receives data, e.g., a packet. The node determines that the data is associated with a particular capability, e.g., is formatted according to a particular data plane capability, such as BIER. At 1004, the node performs a forwarding lookup. In one embodiment, this involves determining the next-hop to which the data should be forwarded using a forwarding table associated with the particular capability. In this example, the node uses a BIER forwarding table, or bit-indexed forwarding table (BIFT).

At 1006, the node determines whether the forwarding table indicates that the data should be forwarded using a tunnel. For example, a forwarding entry corresponding to an address in the data's header can indicate whether or not the next-hop is a tunnel identifier. If not, the node forwards the data using normally, e.g., using BIER forwarding, at 1010. Otherwise, at 1008, the node forwards the data using the tunnel identified in the forwarding information.

Figure 11:
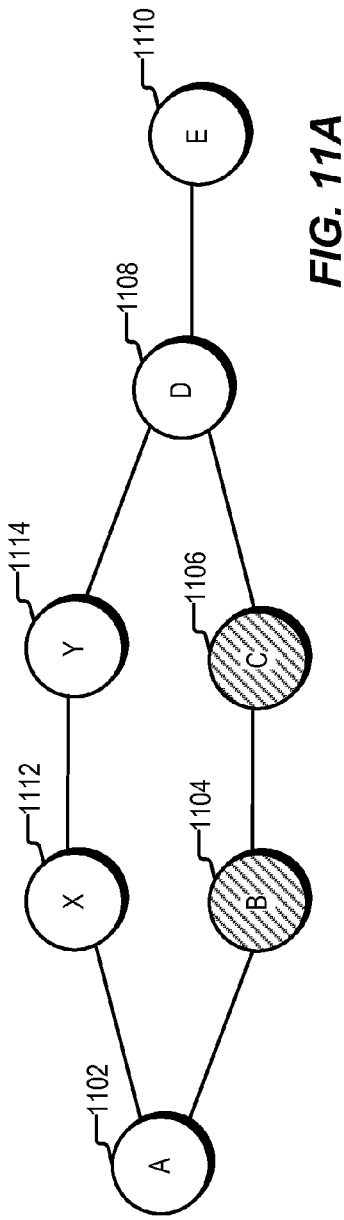
FIG. 11A is a simplified block diagram illustrating certain components of an example network.
FIG. 11B is an example table, according to the present description.
FIG. 11C is an example table, according to the present description.

FIG. 11A shows an example network 1100. Network 1100 is similar to network 200, except that there exists an equal cost path. That is, if node 1102 receives data addressed for node 1108, node 1102 can forward the data via a first branch including nodes 1104 and 1106. Alternatively, node 1102 can forward the data via a second branch including nodes 1112 and 1114. For the purpose of this example, it is assumed that the cost of the two branches is identical. However, if node 1102 forwards the data via node 1104, node 1102 will have to use a tunnel to bypass nodes 1104 and 1106, since nodes 1104 and 1106 are non-capable nodes. Node 1102 chooses between the available branches (equal cost paths). In one embodiment, node 1102 is configured to choose to forward the data via the branch that does not involve the use of tunnels.

FIG. 11B shows an example routing table built by node 1102. The routing table identifies shortest path next-hops to each destination in network 1100. The routing protocol builds a unicast routing table, as shown in FIG. 11B, that is independent of any capability information. For nodes 1108 and 1110, the routing table indicates that there are two equal cost next-hops.

The routing protocol also builds a routing table for each capability. One such routing table is shown in FIG. 11C. FIG. 11C shows an example routing table also generated by node 1102. The routing table shown in FIG. 11C only lists nodes that are capable. As can be seen, the capable nodes in network 1100 are node 1102, node 1108, node 1110, node 1112, and node 1114. The routing table entries for nodes 1108 and 1110 indicate that data can be forwarded to node X or to a tunnel identified as $T_D$.

Figure 12:
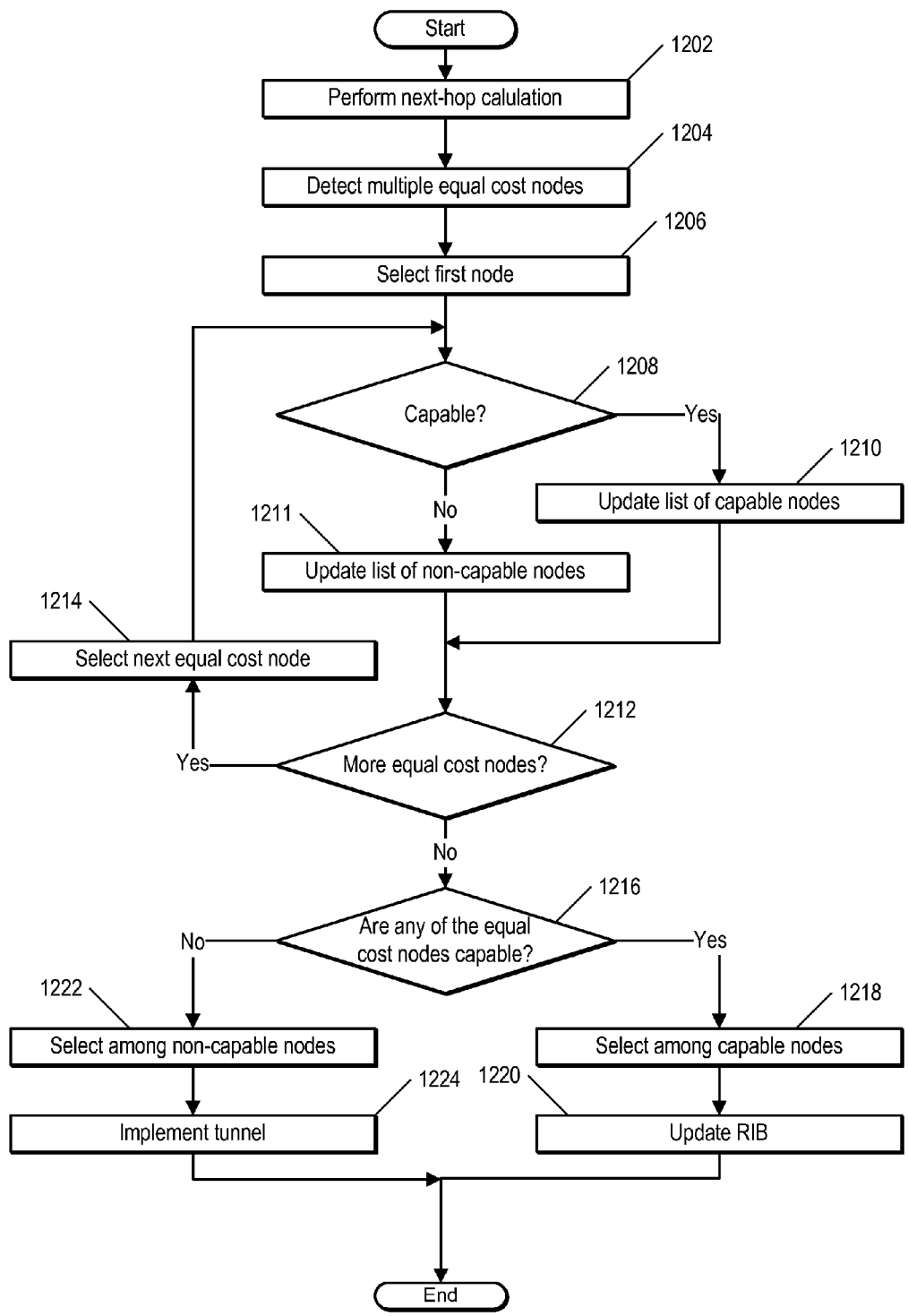
FIG. 12 is a flow chart illustrating an example process, according to the present description.

FIG. 12 shows details of forwarding data in a network that includes equal cost paths, where one or more of the paths utilizes a tunnel to bypass non-capable nodes. In one embodiment, FIG. 12 is performed by a node, such as node 1102 of FIG. 11A. The elements of FIG. 12 can be performed concurrently with an SPF tree calculation process.

At 1202, the node performs the next-hop calculation to determine to the next-hop on the shortest path to a particular destination. The node detects, at 1204, that there are multiple equal costs nodes. At 1206, the node selects a first node of the multiple equal costs nodes.

The node determines, at 1208, whether the selected node is capable. If so, the node updates a list of capable nodes by adding information identifying the selected node to the list. Otherwise, if the node determines that the selected node is not capable, the node updates a list of non-capable nodes by adding the information identifying the node to the list of non-capable nodes at 1211. At 1212, the node determines whether there are more equal cost nodes. If so, the node selects the next equal cost node at 1214 and repeats.

After all of the equal costs nodes have been identified, the node determines, at 1216, whether any of the equal costs nodes are capable. If there is at least one capable node among the equal costs nodes, the node can avoid using tunnels, by selecting among capable nodes at 1218. The selection mechanism can be arbitrary, such as round-robin, or can be based on some other criteria, such as load, performance, bandwidth, or the like.

At 1220, the node updates routing information indicating that the selected capable node is the next-hop towards the given destination. On the other hand, if the node determines, at 1216, that none of the equal cost nodes are capable, the node selects among the non-capable nodes at 1222. The selection mechanism can be arbitrary, such as round-robin, or can be based on some other criteria, such as load, performance, bandwidth, or the like. At 1224, the node implements a tunnel, as described previously.

Figure 13:
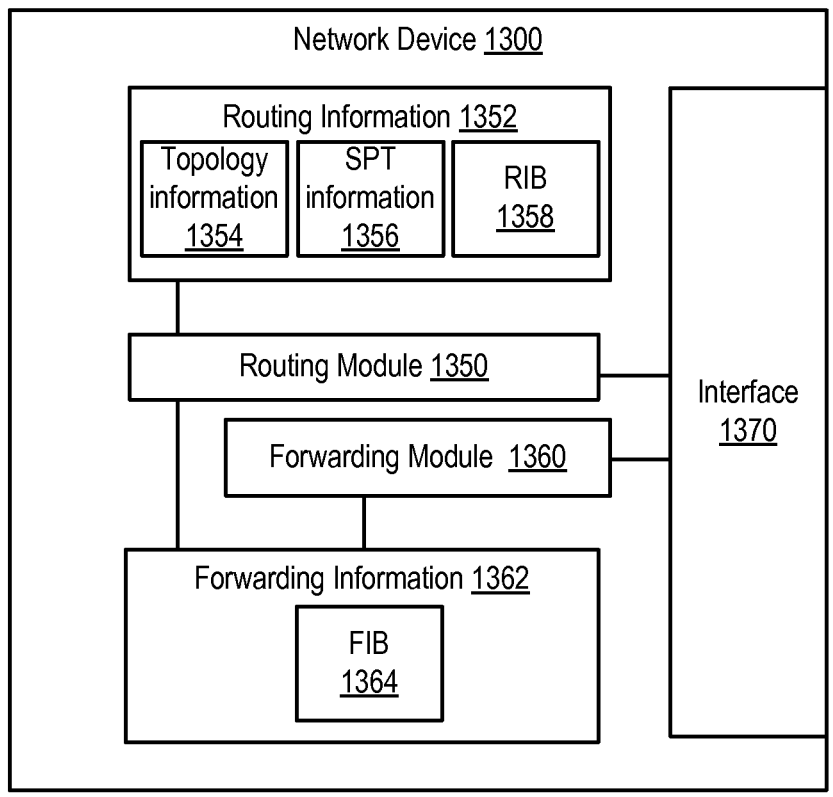
FIG. 13 is a block diagram illustrating certain components of an example node that can be employed in a network.

FIG. 13 is a block diagram illustrating certain components of a network device that can be associated with a node in one of the networks described herein. Network device 1300 can, for example, be associated with a node in network 200 of FIG. 2. In the embodiment of FIG. 13, network device 1300 includes a routing module 1350, routing information 1352, forwarding module 1360, forwarding information 1362 and a communication interface 1370. In an embodiment, communication interface 1370 comprises multiple interfaces, and is configured both for sending and receiving messages within a network and for sending and receiving control information, either between network nodes or between the network device and a controller. Each interface may be a physical interface or a logical interface.

In an embodiment, RIB 1358 within routing information 1352 includes one or more routing tables, such as a unicast routing table and one or more feature RIBs, or capable routing tables that correspond to particular capabilities of nodes in the network. SPT information 1356 includes information determined by the node during one or more SPF tree calculations. Topology information 1354 includes information transmitted link state information distribution mechanisms, such as link state advertisements or packets. Topology information 1354 includes a link state database. Routing module 1350 generates and/or receives routing information 1352 and makes the information available to forwarding module 1360.

In the embodiment of FIG. 13, forwarding information 1362 includes a FIB, or forwarding table 1364. In an embodiment, FIB 1364 is a unicast forwarding table built using one or more routing tables included in RIB 1358. In such an embodiment, inclusion of routing module 1350, routing information 1352 and forwarding information 1362 allows network device 1300 to generate and utilize tunnels to bypass one or more non-capable nodes. In the embodiment of FIG. 13, communication over interface 1370 is handled via forwarding module 1360 and routing module 1350. In other embodiments, storing and updating of forwarding information 1362 and/or routing information 1352 may be done through separate connections to interface 1370, such as via one or more communication modules not shown in FIG. 13. Forwarding module 1360 is configured to forward messages using stored forwarding information 1362. For example, forwarding module 1360 may perform a forwarding process similar to that illustrated in FIG. 10. Forwarding information 1362 is used by forwarding module 1360.

Figure 14:
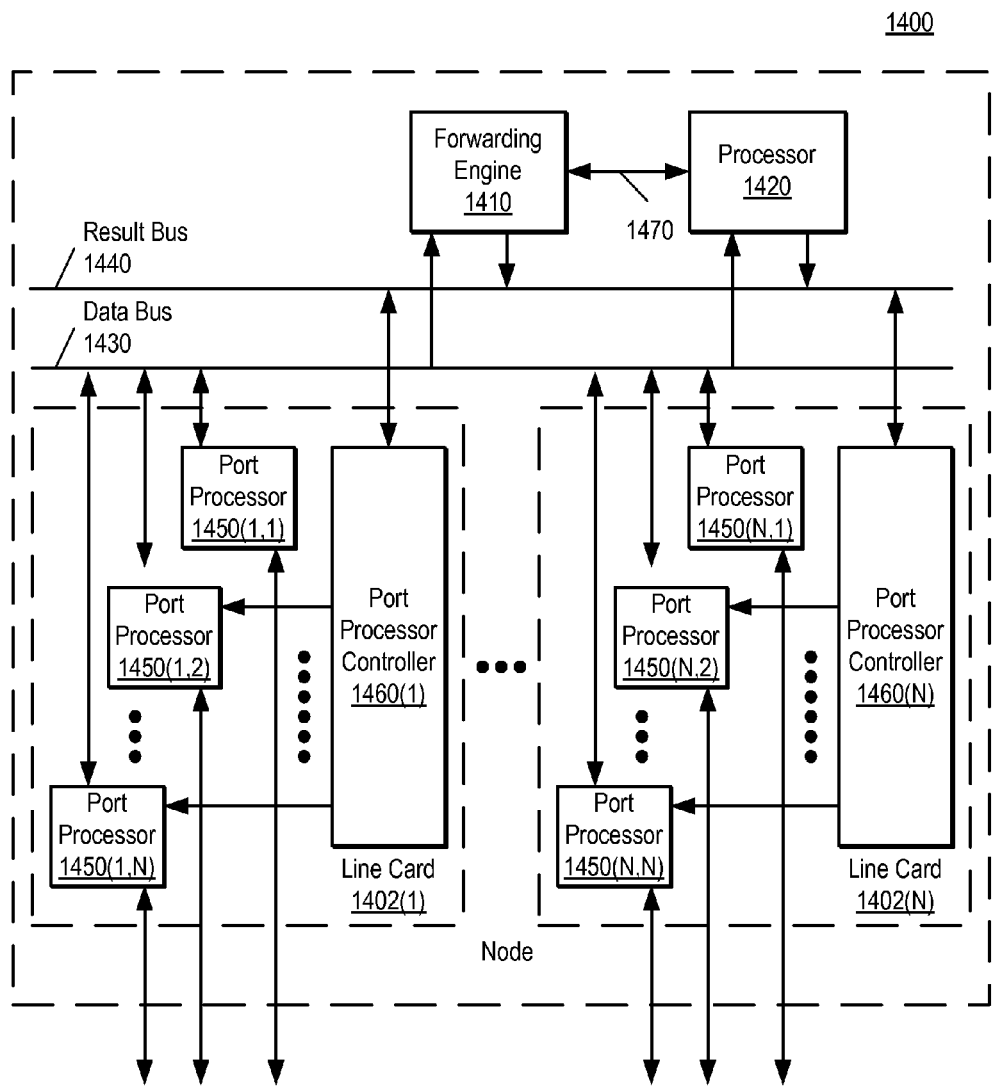
FIG. 14 is a block diagram depicting a computer system suitable for implementing embodiments of the systems described herein.

FIG. 14 is a block diagram illustrating certain additional and/or alternative components of nodes that can be employed in the networks described herein. In this depiction, node 1400 includes a number of line cards (line cards 1402(1)-(N)) that are communicatively coupled to a forwarding engine or packet forwarder 1410 and a processor 1420 via a data bus 1430 and a result bus 1440. Line cards 1402(1)-(N) include a number of port processors 1450(1, 1)-(N, N) which are controlled by port processor controllers 1460(1)-(N). It will also be noted that forwarding engine 1410 and processor 1420 are not only coupled to one another via data bus 1430 and result bus 1440, but are also communicatively coupled to one another by a communications link 1416.

The processors 1450 and 1460 of each line card 1402 may be mounted on a single printed circuit board. When a packet or packet and header are received, the packet or packet and header may be identified and analyzed by router 1400 in the following manner. Upon receipt, a packet (or some or all of its control information) or packet and header is sent from the one of port processors 1450(1, 1)-(N, N) at which the packet or packet and header was received to one or more of those devices coupled to data bus 1430 (e.g., others of port processors 1450(1, 1)-(N, N), forwarding engine 1410 and/or processor 1420). Handling of the packet or packet and header can be determined, for example, by forwarding engine 1410. For example, forwarding engine 1410 may determine that the packet or packet and header should be forwarded to one or more of port processors 1450(1, 1)-(N, N). This can be accomplished by indicating to corresponding one(s) of port processor controllers 1460(1)-(N) that the copy of the packet or packet and header held in the given one(s) of port processors 1450(1,1)-(N,N) should be forwarded to the appropriate one of port processors 1450(1,1)-(N,N). In addition, or alternatively, once a packet or packet and header has been identified for processing, forwarding engine 1410, processor 1420 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 15:
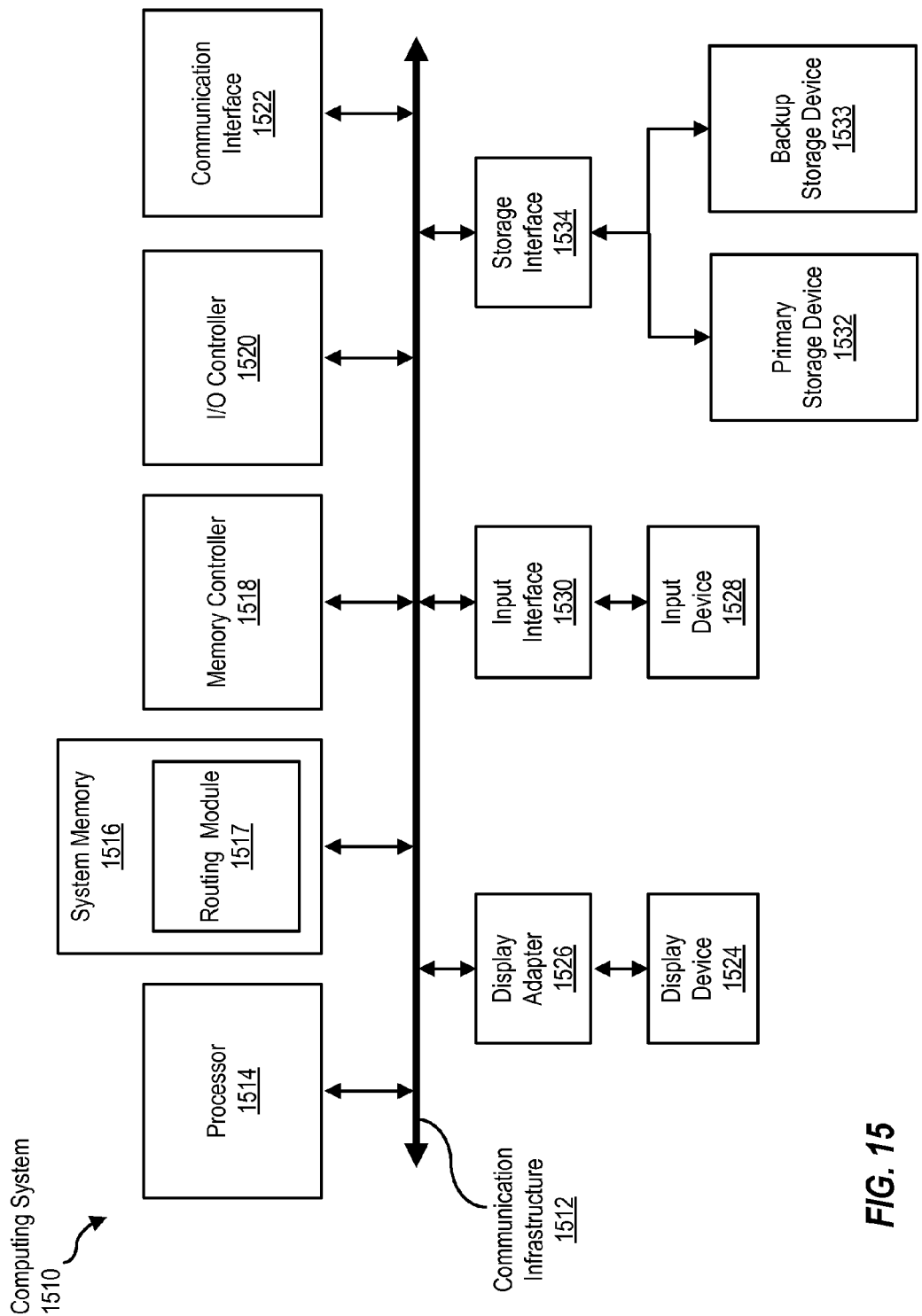
FIG. 15 is a block diagram depicting a network device suitable for implementing embodiments of the systems described herein.

FIG. 15 is a block diagram of a computing device, illustrating, for example, implementation of a forwarding module in software as described above. Computing system 1510 broadly represents any single or multi-processor computing device or system capable of executing computer-readable instructions. Examples of computing system 1510 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1510 may include at least one processor 1514 and a system memory 1516. By executing the software that implements a forwarding module 1517, computing system 1510 becomes a special purpose computing device that is configured to perform packet forwarding, in the manner described above.

Processor 1514 generally represents any type or form of processing unit capable of processing data or interpreting and executing instructions. In certain embodiments, processor 1514 may receive instructions from a software application or module. These instructions may cause processor 1514 to perform the functions of one or more of the embodiments described and/or illustrated herein. For example, processor 1514 may perform and/or be a means for performing the operations described herein. Processor 1514 may also perform and/or be a means for performing any other operations, methods, or processes described and/or illustrated herein.

System memory 1516 generally represents any type or form of volatile or non-volatile storage device or medium capable of storing data and/or other computer-readable instructions. Examples of system memory 1516 include, without limitation, random access memory (RAM), read only memory (ROM), flash memory, or any other suitable memory device. Although not required, in certain embodiments computing system 1510 may include both a volatile memory unit (such as, for example, system memory 1516) and a non-volatile storage device (such as, for example, primary storage device 1532, as described in detail below). In one example, program instructions executable to implement a forwarding module configured to forward multicast data packets may be loaded into system memory 1516.

In certain embodiments, computing system 1510 may also include one or more components or elements in addition to processor 1514 and system memory 1516. For example, as illustrated in FIG. 15, computing system 1510 may include a memory controller 1518, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an Industry Standard Architecture (ISA), Peripheral Component Interconnect (PCI), PCI express (PCIe), or similar bus) and a network.

Memory controller 1518 generally represents any type or form of device capable of handling memory or data or controlling communication between one or more components of computing system 1510. For example, in certain embodiments memory controller 1518 may control communication between processor 1514, system memory 1516, and I/O controller 1520 via communication infrastructure 1512. In certain embodiments, memory controller 1518 may perform and/or be a means for performing, either alone or in combination with other elements, one or more of the operations or features described and/or illustrated herein.

I/O controller 1520 generally represents any type or form of module capable of coordinating and/or controlling the input and output functions of a computing device. For example, in certain embodiments I/O controller 1520 may control or facilitate transfer of data between one or more elements of computing system 1510, such as processor 1514, system memory 1516, communication interface 1522, display adapter 1526, input interface 1530, and storage interface 1534.

Communication interface 1522 broadly represents any type or form of communication device or adapter capable of facilitating communication between computing system 1510 and one or more additional devices. For example, in certain embodiments communication interface 1522 may facilitate communication between computing system 1510 and a private or public network including additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1522 may also allow computing system 1510 to engage in distributed or remote computing. For example, communication interface 1522 may receive instructions from a remote device or send instructions to a remote device for execution.

As illustrated in FIG. 15, computing system 1510 may also include at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer) for display on display device 1524.

As illustrated in FIG. 15, computing system 1510 may also include at least one input device 1528 coupled to communication infrastructure 1512 via an input interface 1530. Input device 1528 generally represents any type or form of input device capable of providing input, either computer or human generated, to computing system 1510. Examples of input device 1528 include, without limitation, a keyboard, a pointing device, a speech recognition device, or any other input device.

As illustrated in FIG. 15, computing system 1510 may also include a primary storage device 1532 and a backup storage device 1533 coupled to communication infrastructure 1512 via a storage interface 1534. Storage devices 1532 and 1533 generally represent any type or form of storage device or medium capable of storing data and/or other computer-readable instructions. For example, storage devices 1532 and 1533 may be a magnetic disk drive (e.g., a so-called hard drive), a floppy disk drive, a magnetic tape drive, an optical disk drive, a flash drive, or the like. Storage interface 1534 generally represents any type or form of interface or device for transferring data between storage devices 1532 and 1533 and other components of computing system 1510. A storage device like primary storage device 1532 can store information such as routing tables and forwarding tables.

In certain embodiments, storage devices 1532 and 1533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also include other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may also be a part of computing system 1510 or may be a separate device accessed through other interface systems.

Many other devices or subsystems may be connected to computing system 1510. Conversely, all of the components and devices illustrated in FIG. 15 need not be present to practice the embodiments described and/or illustrated herein. The devices and subsystems referenced above may also be interconnected in different ways from that shown in FIG. 15.

Computing system 1510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1510 for storage in memory via a network such as the Internet or upon a carrier medium.

The computer-readable medium containing the computer program may be loaded into computing system 1510. All or a portion of the computer program stored on the computer-readable medium may then be stored in system memory 1516 and/or various portions of storage devices 1532 and 1533. When executed by processor 1514, a computer program loaded into computing system 1510 may cause processor 1514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1510 may be configured as an application specific integrated circuit (ASIC) adapted to implement one or more of the embodiments disclosed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining that an adjacent node is non-capable, wherein
        the determining is performed by a capable node,
        the adjacent node is adjacent to the capable node,
        the adjacent node is non-capable by virtue of not being configured to implement a data plane capability,
        the capable node is capable by virtue of being configured to implement the data plane capability,
        the determining comprises
            recovering capability information by parsing information received from the adjacent node in a routing update message, and
        the capability information indicates whether the adjacent node is capable or non-capable;
    identifying a capable downstream node, wherein
        the identifying is performed by the capable node,
        the capable downstream node is configured to implement the data plane capability, and
        the capable downstream node is on a shortest path from the capable node to the capable downstream node; and
    generating information identifying a tunnel having a tail at the capable downstream node, wherein
        the generating is performed by the capable node.

2. The method of claim 1, wherein the tunnel comprises at least one of:
    a GRE tunnel;
    a TE tunnel;
    an MPLS LSP; or
    an IP tunnel.

3. The method of claim 1, further comprising:
    generating the tunnel in response to the identifying, wherein
        the tunnel begins at the capable node and ends at the capable downstream node.

4. The method of claim 1, further comprising:
    updating routing information to include the information.

5. The method of claim 1, further comprising:
    updating a tunnel prototype to include information identifying the adjacent node.

6. The method of claim 1, further comprising:
    including the information in a list of tunnels.

7. The method of claim 6, further comprising:
    detecting a configuration change, wherein
        the configuration change comprises at least one of a topology change or a node configuration change; and
        updating the list of tunnels in response to the detecting.

8. The method of claim 7, wherein
    the updating comprises removing information identifying a first tunnel from the list of tunnels, and
    the removing comprises determining whether the first tunnel has exceeded an age threshold.

9. The method of claim 1, wherein
    the identifying comprises performing a shortest path first (SPF) calculation.

10. The method of claim 1, wherein the data plane capability comprises bit-indexed explicit replication (BIER).

11. The method of claim 1, wherein the routing update message is a link state advertisement.

12. The method of claim 1, wherein
    each node between the capable node and the capable downstream node on the shortest path is non-capable.

13. A network device comprising:
    one or more network interfaces;
    a processor configured to implement a data plane capability; and
    a computer-readable storage medium coupled to the processor, the computer-readable storage medium storing instructions executable by the processor to implement a method comprising
        determining that an adjacent network device is non-capable, wherein the network device is a capable node,
            the adjacent network device is adjacent to the network device,
            the adjacent network device is a non-capable node,
            the adjacent network device is non-capable by virtue of not being configured to implement a data plane capability,
            the network device is capable by virtue of being configured to implement the data plane capability,
            the determining comprises
                recovering capability information by parsing information received from the adjacent network device in a routing update message, and
            the capability information indicates whether the adjacent network device is capable or non-capable, identifying a capable downstream network device, wherein the identifying is performed by the network device,
  the capable downstream network device is configured to implement the data plane capability, and
  the capable downstream network device is on a shortest path from the network device to the capable downstream network device,
generating information identifying a tunnel having a tail at the capable downstream network device.

14. The network device of claim 13, further comprising:
generating the tunnel in response to the identifying, wherein
  the tunnel begins at the network device and ends at the capable downstream network device.

15. The network device of claim 13, further comprising:
updating routing information to include the information; and
updating a tunnel prototype to include information identifying the adjacent network device.

16. The network device of claim 13, further comprising:
detecting a configuration change, wherein
  the configuration change comprises at least one of a topology change or a node configuration change; and
updating a list of tunnels in response to the detecting.

17. The network device of claim 16, wherein
the updating comprises removing a first tunnel from the list of tunnels, and
the removing comprises determining whether the first tunnel has exceeded an age threshold.

18. The network device of claim 13, wherein
the identifying comprises performing a shortest path first (SPF) calculation.

19. The network device of claim 13, wherein the routing update message is a link state advertisement.

20. The network device of claim 13, wherein
each network device between the network device and the capable downstream network device on the shortest path is non-capable.

21. A computer program product comprising:
a plurality of instructions, comprising
  a first set of instructions, executable by a processor of a network device, configured to determine that an adjacent network device is non-capable, wherein
    the network device is a capable node,
    the adjacent network device is adjacent to the network device,
    the adjacent network device is a non-capable node,
    the adjacent network device is non-capable by virtue of not being configured to implement a data plane capability,
    the network device is capable by virtue of being configured to implement the data plane capability,
    the first set of instructions comprises
      a first subset of instructions, executable by the processor of the network device, configured to recover capability information by parsing information received from the adjacent network device in a routing update message, and
    the capability information indicates whether the adjacent network device is capable or non-capable,
  a second set of instructions, executable on the processor of the network device, configured to identify a capable downstream network device, wherein
    the capable downstream network device is configured to implement the data plane capability, and
    the capable downstream network device is on a shortest path from the network device to the capable downstream network device, and
  a third set of instructions, executable on the processor of the network device, configured to generate information identifying a tunnel having a tail at the capable downstream network device; and
a computer-readable storage medium, wherein the instructions are encoded in the computer-readable storage medium.

* * * * *